UNITED STATES PATENT OFFICE 2,285,813

VULCANIZATION ACCELERATOR

Roy S. Hanslick, New Haven, Conn., assignor to United States Rubber Company, New York, N. Y., a corporation of New Jersey No Drawing. Application June 22, 1939, Serial No. 280,445

5 Claims. (Cl. 260—793)

This invention relates to a new class of compounds which have been found valuable as accelerators of the vulcanization of rubber and particularly as activators of accelerators of the mercaptobenzothiazole class.

The new class of rubber vulcanization accelerators are the reaction products of compounds containing the group $$=\text{N}-\overset{\overset{\text{S}}{\|}}{\text{C}}-\text{S}-$$

that is dithiocarbamates, with monochloramine, preferably with an aqueous solution containing the monochloramine. The carbamyl nitrogen atom may be attached to alicyclic, acyclic, aromatic or heterocyclic groups. The preferred groups are the alkyl groups including those having an aryl group attached to the far side of the alkyl group such as benzyl. The reaction is carried out at temperatures between 0 and 100° C. and preferably between 0 and 10° C. The resulting products are called thiocarbamyl sulfamines comprising the group

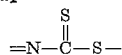

The following examples are given to illustrate the invention:

EXAMPLE I

A water solution containing 42.9 grams (0.3 mole) of sodium dimethyl dithiocarbamate is cooled to 0.5° C. by means of an ice-water bath. A freshly prepared water solution containing 15.5 grams (0.3 mole) plus 10% excess of monochloramine chilled to 0-5° C., is slowly added to the aqueous sodium dimethyl dithiocarbamate solution. Rapid stirring is employed. Upon the complete addition of the aqueous monochloramine solution, stirring is continued for five to ten minutes whereupon the white material is then filtered off and washed with water. The material is then dried. Melting point is 70-71° C. (uncorrected). Dimethyl thiocarbamyl sulfamine is obtained in a yield of 39-40.5 grams.

The reaction may be expressed as follows:

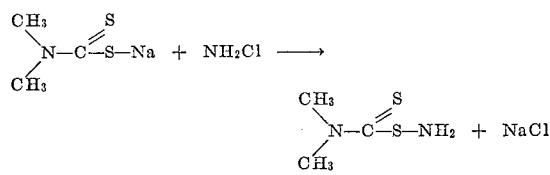

ANALYSIS

|  | Theory | Obtained |
|---|---|---|
|  | Per cent | Per cent |
| Nitrogen | 20.4 | 20.2 |
| Sulfur | 45.6 | 46.1 |

EXAMPLE II

A water solution containing 22.7 grams (0.1 mole) of sodium di-n-butyl dithiocarbamate is cooled to 0-5° C. 5.15 grams (0.1 mole) plus 10% excess of monochloramine in aqueous solution is added with good stirring of the mixture solution. A white precipitate is formed which is filtered off, washed with water and then dried. The material is low melting. Di-n-butyl thiocarbamyl sulfamine is obtained in a yield of 20-21.5 grams.

EXAMPLE III

A water solution containing 31.1 grams (0.1 mole) of potassium dibenzyl dithiocarbamate is cooled to 0-5° C. A freshly prepared solution of 5.15 grams (0.1 mole) plus 10% excess of monochloramine in aqueous solution is added to the potassium dithiocarbamate solution. A precipitate separates and the solution is well stirred. The material is filtered off, washed with water and then dried. Melting point is 66-69° C. (uncorrected). Dibenzyl thiocarbamyl sulfamine is obtained in a yield of 27-28.5 grams.

ANALYSIS

|  | Theory | Obtained |
|---|---|---|
|  | Per cent | Per cent |
| Nitrogen | 9.75 | 8.9 |
| Sulfur | 22.2 | 20.2 |

Similarly compounds such as oxy-di-ethylene thiocarbamyl sulfamine (melting point 126-128° C. (uncorrected)) and cyclo penta methylene thiocarbamyl sulfamine (melting point 43-44° C. (uncorrected)) may be prepared.

Instead of sodium or potassium salts of dithiocarbamic acids, there may be used the ammonium, calcium, barium, and other metal salts for reaction with chloramine.

The dithiocarbamate employed to react with monochloramine may be N-substituted with various groupings such as ethyl, propyl, isopropyl, isobutyl, amyl, isoamyl, phenyl, cyclohexyl, phenyl ethyl, heterocyclic radicals from morpholine, and piperidyl, such as cyclopentamethylene and oxy-di-ethylene.

In the preferred compounds, namely the dialkyl substituted dithiocarbamates, which are used to react with monochloramine, the alkyl groups may be any of the above referred to alkyl groups, and the alkyl groups may be similar or dissimilar in any given compound, to produce the corresponding dialkyl thiocarbamyl sulfamines.

The following data illustrates the accelerating effect of the compounds; the parts are by weight:

Recipe

| | |
|---|---|
| Pale crepe | 100 |
| Zinc oxide | 5 |
| Whiting | 60 |
| Lithopone | 60 |
| Zinc soap of cocoanut oil acids | 0.50 |
| Sulfur | 3.00 |
| Zinc salt of mercaptobenzothiazole | 0.50 |
| Master batch | 229.00 |
| Dimethyl thio carbamyl sulfamine | 0.05 |
| | 229.05 |

Tensiles

Unaged

| Cure in minutes at 25 lbs./sq. n. steam pressure | T | E |
|---|---|---|
| 10 | 1,500 | 640 |
| 15 | 2,560 | 680 |
| 20 | 2,600 | 686 |
| 30 | 2,600 | 686 |

T = Ultimate tensiles in pounds per square inch.
E = Percent elongation at break.

If desired, the new accelerators may be used with any of the well-known basic nitrogen-containing accelerators used in activating the accelerators of the mercapto thiazole type, including the guanidine and substituted guanidine salts, such as diphenyl guanidine salt of aliphatic and aromatic acids.

The present accelerators are best used in conjunction with arylene thiazyl sulphide accelerators such as mercaptobenzothiazole and its derivatives, including its salts, such as those of zinc. In this connection the two accelerators may be added separately on the mill or they may be mixed prior to addition on the mill.

The invention may be applied to the vulcanization of natural rubbers as well as artificially prepared rubbers adaptable to vulcanization with sulfur, including reclaims and latices of such rubber compositions.

The present invention is not limited to the specific examples above set forth wherein the preferred accelerator is employed. Other ratios of the compounding ingredients than those mentioned in the examples as well as other well known fillers, pigments and the like may be employed in the production of various types of rubber compounds as will be apparent to those skilled in the art to which this invention pertains.

Having thus described my invention, what I claim and desire to protect by Letters Patent is:

1. A process of accelerating the vulcanization of rubber which comprises vulcanizing it in the presence of a thiocarbamyl sulfamine wherein the amine group attached to sulfur is a primary amine group.

2. A process of accelerating the vulcanization of rubber which comprises vulcanizing it in the presence of an alkyl N-substituted thiocarbamyl sulfamine wherein the amine group attached to sulfur is a primary amine group.

3. A process of accelerating the vulcanization of rubber which comprises vulcanizing it in the presence of an accelerator which is a product of reaction of a dithiocarbamate and monochloramine.

4. A rubber product which has been vulcanized in the presence of a thiocarbamyl sulfamine wherein the amine group attached to sulfur is a primary amine group.

5. A rubber product which has been vulcanized in the presence of an accelerator which is a product of reaction of a dithiocarbamate and monochloramine.

ROY S. HANSLICK.